Oct. 26, 1965 A. H. BOBECK 3,214,742

MAGNETIC INDUCTIVE MEMORY WITH ELECTRODES ON CONDUCTIVE SHEETS

Filed Dec. 23, 1960 5 Sheets-Sheet 1

INVENTOR
A. H. BOBECK
BY
William H. Kamstra
ATTORNEY

MAGNETIC INDUCTIVE MEMORY WITH ELECTRODES ON CONDUCTIVE SHEETS

Filed Dec. 23, 1960

INVENTOR
A. H. BOBECK
BY
William H. Kamstra
ATTORNEY

Oct. 26, 1965 A. H. BOBECK 3,214,742

MAGNETIC INDUCTIVE MEMORY WITH ELECTRODES ON CONDUCTIVE SHEETS

Filed Dec. 23, 1960 5 Sheets-Sheet 3

INVENTOR
A. H. BOBECK
BY
William H. Kamstra
ATTORNEY

MAGNETIC INDUCTIVE MEMORY WITH ELECTRODES ON CONDUCTIVE SHEETS

Filed Dec. 23, 1960 5 Sheets-Sheet 4

INVENTOR
A. H. BOBECK
BY William H. Kamstra
ATTORNEY

INVENTOR
A. H. BOBECK
BY
William H. Kamstra
ATTORNEY

United States Patent Office 3,214,742
Patented Oct. 26, 1965

3,214,742

MAGNETIC INDUCTIVE MEMORY WITH ELECTRODES ON CONDUCTIVE SHEETS

Andrew H. Bobeck, Chatham, N.J., assignor to Bell Telephone Laboratories, Incorporated, New York, N.Y., a corporation of New York Filed Dec. 23, 1960, Ser. No. 77,873
3 Claims. (Cl. 340—174)

This invention relates to magnetic devices and circuits, and particularly to such devices and circuits adapted to perform inductive and memory functions.

Magnetic flux saturation devices, both those of the square loop type and those having more linear hysteresis loops, have found wide application in the information handling and pulse switching arts. These devices have taken a number of forms and such structures as toroidal cores, apertured sheets, multileg flux steering structures and the like, have been usefully employed in a variety of contexts to perform specific switching and inductive functions. In each of these cases the magnetic structure conventionally serves as the core for various input, output, and control windings coupled thereto in particular applications. Thus whether the core is of a square loop material and hence is capable of performing a memory function or whether a straight transformer action is accomplished, the various windings are controllably linked by flux appearing in the flux paths presented by the core structure. With the advent of magnetic wire memory elements a new mode of operation with respect to inductive devices is advantageously made possible. In a related application of the present inventor, Serial No. 675,522, filed August 1, 1957, now U.S. Patent 3,083,353, issued March 26, 1963, a magnetic memory device is described which itself comrpises one of its energizing and interrogation windings. The memory device is fabricated of an electrically conductive square loop magnetic material such that current pulses applied to the device are effective to cause flux changes therein, and conversely, when flux changes are caused in the device, differences of potential appear across separated points of the magnetic device itself. These potential signals may conventionally be detected by known circuit means.

Magnetic materials having the required electrical conductivity while at the same time exhibiting sufficiently rectangular hysteresis characteristics when a memory function is to be performed, have thus proven highly useful as exemplified in the foregoing copending application. The availability of such magnetic materials has made possible improvements and modes of operation in both straight inductive circuits and those capable of a memory function not hitherto achievable. One highly important advantage to be gained from the employment of magnetic devices formed of an electrically conductive material is the reduction in size of the circuit incorporating the devices. Manifestly in prior art arrangements a limitation is imposed on the extent to which an inductive element may be reduced in size by the necessity of externally coupling windings thereto. The aperture of a toroidal core, for example, must be sufficiently large to accommodate all of the energizing windings which the design of the incorporating circuit may dictate. Sufficient magnetic material must then also be available in which flux may be switched. Accordingly, a substantial reduction in the dimensions of a magnetic inductive element would make possible an advantageous reduction in the overall dimensions of the incorporating circuit. The increasing demand for miniaturization of electrical circuits also emphasizes the need for magnetic inductive elements of extremely small size regardless of their particular hysteresis properties.

Accordingly it is one object of this invention to achieve magnetic memory and inductance elements and circuits having advantages in terms of simplicity of fabrication and reduction in size not hitherto obtainable.

It is also an object of this invention to adapt magnetic materials exhibiting both electrical conductivity and substantially rectangular hysteresis characteristics to other new and novel magnetic inductive devices and circuits.

It is a specific object of this invention to achieve new and novel coordinate array magnetic information storage arrangements.

Still another specific object of this invention is to provide a novel inductance device for determining the correlation between two groups of random occurrences.

In accordance with the principles of this invention a magnetic medium such as a film or sheet, for example, having square loop magnetic and electrically conductive properties, has a pair of electrodes oppositely disposed on either side thereof. The electrodes are in electrical contact with the magnetic medium and are included in an energizing circuit also including a source of energizing current pulses. When an energizing current pulse is applied to one of the electrodes the circuit is completed through the magnetic medium and an internal field thus generated induces a remanent flux in an isolated portion of the medium between the two electrodes. The extent to which the isolated portion of the medium is remanently saturated, that is, the fully switched area of the medium, is manifestly determined by the magnitude of the energizing current pulse. As the magnitude of the latter current pulse is reduced, it becomes apparent that a lower limit will be reached in the dimensions of the magnetized area as that area approaches the dimensions of the contacts of the electrodes with the magnetic medium. Advantageously in accordance with the principles of this invention, the contacts of the electrodes are reduced to points which may be microscopic in dimension. As a result, the remanently magnetized area of the medium may be correspondingly reduced and, importantly, the energizing current pulses required to drive the magnetized area to remanent saturation, decreased to levels not heretofore possible in magnetic memory arrangements.

Any flux changes occurring in the magnetic medium, as during an interrogation of information stored in the medium in the form of a remanent magnetization, may be detected by externally coupled sensing windings or directly across sensing points of the magnetic medium itself in accordance with the known operation of such conductive memory elements.

The principles of this invention thus far described may also be applied to realize an advantageous magnetic memory array in which a plurality of electrodes are arranged into electrical contact on one side of a conductive magnetic sheet or film. The other side of the sheet is placed in electrical contact with a nonmagnetic conducting plate. Binary "1's" may be written into the sheet as isolated points defined by selected electrodes by simultaneously energizing the selected electrodes and connecting the conducting plate to a source of ground potential. The current thus passing through the magnetic sheet at the points of the selected electrodes induces remanent magnetizations in the sheet at those points representative of the binary "1's" to be stored. Binary "0's" may then be represented in the storage sheet by the absence of magnetizations by simply maintaining an open circuit between either the write current source and the writing electrode or between the conducting plate and ground during the write interval. A highly useful and readily fabricated memory array is thus achieved in which the storage density of the bit addresses is limited only by the physical dimensions of the electrode points and the means available for the detection of the output signal levels generated.

The reduction of a magnetizable area in a magnetic medium in accordance with this invention as described generally in the foregoing also makes possible the achievement of straight inductive devices highly useful in miniaturized electrical circuits. Thus, for example, an inductor having no external windings may be realized which comprises only an extremely small medium of conductive magnetic material maintained in electrical contact between the microscopic points of a pair of energizing electrodes. Internal fields generated by low level signal pulses passing through the medium itself then achieve the impedance changes presented by the inductor.

In one embodiment of this invention representing another novel departure from conventional magnetic memory arrangements the magnetic medium comprises a large number of magnetic fibers or strands of an electrically conductive square loop material which are interwoven in a completely random fashion and closely packed to form a pad-like solid. Each of the strands of the maze of strands thus formed makes physical contact with one or more other strands. As a result, electrical and magnetic continuity may be traced from any one point in the pad to any one or unlimited number of other points in the structure by a virtually unlimited number of paths. According to this invention a plurality of input probes are provided in electrical contact wtih the strands of the structure at first random points. Another plurality of output probes are then provided also in electrical contact with the strands of the structure at second random points. It will be apparent from the internal physical contacts of the conductive magnetic strands of the structure with each other that a plurality of electrically conductive parallel paths will be available from each of the input probes to each and every one of the output probes.

An electrical circuit may thus be completed through the maze of magnetic strands from a selected one of the input probes to another selected output probe via many parallel paths as presented by interconnected segments of the strands. Manifestly, the paths will present varying resistances to a current as determined by the circuitry of the paths through the maze. Thus, the most direct path between the selected probes may be expected to carry the greatest current with the current values in the remaining paths progressively decreasing as the length of the paths increase and become more remote. Further, because of the wholly random interlacing of the strands, it will be apparent that the precise paths taken by such a current will be difficult if not impossible to identify. However, as will become clear hereinafter, in accordance with the principles of this invention the current paths thus described need not be positively defined.

When an initial excitation provided by a current pulse is applied to a selected one of the plurality of input probes the current will be conducted via parallel paths presented by the magnetic strands to the particular output probe which is included in the energizing circuit. The internal fields generated by an initial current pulse tend to drive the magnetic strands comprising the paths to remanent saturation in one direction. Since the magnitude of the fields so generated will vary as the current in the paths, it is clear that, although the connecting strands presenting the most direct path between the energized leads may be completely driven to saturation, more remote paths will be progressively less completely so driven. As a result of the remanent magnetizations thus induced by an initial current pulse, the impedance of the parallel paths to an immediately following current pulse of the same polarity will also vary depending upon the extent to which the strands of the paths were remanently saturated. The current values in the parallel paths during the application of this next following current pulse will vary depending upon the impedance presented in those paths. However, less completely saturated paths will at this time be driven further toward saturation. This operation will continue with each successive current pulse of the same polarity applied to the selected probes until the maximum number of magnetic strands of a conducting path complex have been fully remanently saturated. Preferred conducting paths will thus have been established through the maze of strands and these paths will remain due to the square loop properties of the magnetic strands. Importantly, some part of these preferred paths from the selected input lead to the selected output lead remain no matter how many or which other output leads also offer a circuit path.

The memory properties of the magnetic strands and their ability to provide a varying impedance control as generally described in the foregoing are advantageously combined to achieve a novel comparison circuit in one specific embodiment of this invention. The correlation between two groups of random occurrences within an information handling or data processing system, for example, may readily be determined thereby. The two groups of random occurrences control respectively a plurality of current pulse sources and a plurality of ground sources. As these sources are each randomly energized by the groups of random occurrences, particular conducting paths are "learned" through the maze of strands. The extent to which the paths are "learned" is determined by the frequency with which a conducting path is completed in the interconnected strands between particular current pulse sources and particular ground sources. As reiterative current pulses are conducted through a particular complex of parallel paths, more and more of the strands making up the complex of paths are remanently flux saturated with a corresponding decrease in impedance presented to subsequent current pulses of the same polarity. The particular current pulse sources and ground sources having the greatest, and progressively less, frequency of coincidence of energization, is then readily determined by successively applying voltage pulses of the same polarity as the current pulses to each conducting path in turn with each of the ground sources energized and observing the magnitudes of the currents induced in each of the paths to ground each time the voltage pulse is applied. After such an interrogation operation is completed, it will be evident that the particular current pulse source and ground source having the conducting path therebetween in which the current magnitude is the greatest will also be the sources having the greatest frequency of coincidence of energization.

Paths so "learned" through the maze of strands may also be effectively "unlearned." If a conducting path between a pulse source not previously energized and a ground source which was previously energized is traversed by a current pulse, the pulse will take parallel paths through the strands to that ground source by a path different than a previous current pulse traversed to the same ground source. A new route and a new complex of low impedance paths will be established through the maze of strands. The old path or paths will either be effectively erased or be overridden by alternate paths to the extent that the alternate paths present a lower impedance to subsequent current pulses.

Conducting paths through the strand maze may also be totally "unlearned" in another manner. It will be appreciated that, in the foregoing embodiment of this invention, the low impedance paths established in the maze of strands will remain only if the physical relationship between the interconnected strands is held fixed. Obviously any physical distortion of the magnetic storage medium due to a dislocation of the strands or strand segments will effect the continuity of the electrical conducting paths traceable from an energized pulse source to an energized ground source. At the same time, the remanent flux in the dislocated strands will undergo changes as strands are disconnected and other strands are newly placed in physical contact. The impedance of the connecting paths will consequently also be totally and randomly changed due to the distortion in the magnetc medium.

With the principles of this invention thus generally described in the foregoing, one of the features thereof may also be generally described as the physical connection of an electrically conductive magnetic medium with a pair of energizing electrodes. Internal magnetic fields caused by a current applied to the electrodes induces a magnetic flux in the magnetic medium which may be employed for conventional inductive purposes, or, when the medium is of a magnetic material exhibiting substantially rectangular hysterisis properties, for memory purposes. The electrodes may advantageously be of extremely small physical dimensions in which case an inductive element of a reduced size is realized suitable for use in miniaturized electrical circuits.

According to another feature of this invention an electrically conductive magnetic plate of a magnetic material having substantially rectangular hysteresis characteristics has adjacent thereto on one side and in electrical contact, a ground plate. A polarity of coordinately arranged electrodes define a coordinate array of information addresses on the other side. By selectively energizing the electrodes at the same time that the ground plate is connected to ground, binary information bits may be written into the addresses in the form of remanent magnetizations between the selected electrodes and ground plate.

It is still another feature of this invention that an electrically conductive magnetic plate of a magnetic material having substantially rectangular hysteresis characteristics has arranged on each side thereof and in electrical contact a plurality of conductive strips. The strips on one side are parallelly arranged transversely with the strips on the other side, which latter strips are also parallelly arranged. The two pluralities of strips define a coordinate array of information addresses in the magnetic plate at their intersections. By applying ground to one end of selected ones of one of the groups of strips simultaneously with write current pulses applied to one end of a selected one of the other group of strips, particular binary information bits may be written into a word row of addresses defined by the selected one of the other group of strips in the form of remanent magnetizations between the selected strips.

According to yet another feature of this invention a magnetic memory medium comprises a large number of magnetic fibers or strands of an electrically conductive magnetic material having substantially rectangular hysteresis characteristics, which strands are interwoven in a wholly random fashion. The physical contacts of the strands define a complex of conducting paths between any selected point in the medium to any one or a number of other selected points in the medium. As reiterative current pulses are applied between selected ones of the points, a complex of paths between the points is progressively more positively defined as successive current pulses traverse the paths as a result of the progressive remanent flux saturation of the strands making up the totaltiy of the path complex between the selected points. As the impedance of the paths through the strands is decreased by the progressive magnetic saturation, the successively energized paths are established as the preferred paths between the selected points to subsequent current pulses applied thereto.

This invention together with the objects and features thereof will be better understood from a consideration of the detailed description of specific illustrative embodiments thereof when taken in conjunction with the accompanying drawing in which.

Figure 1:
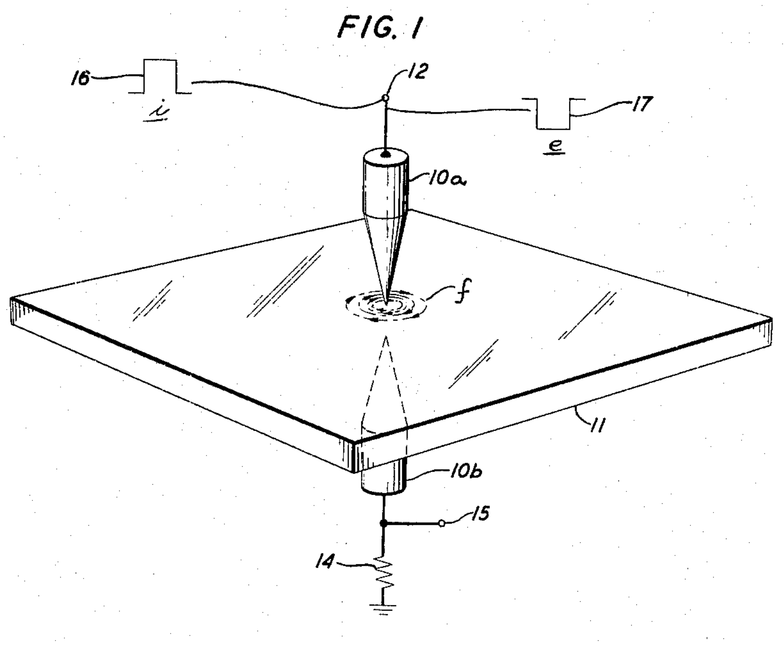
FIG. 1 depicts a simplified inductive device for illustrating the principles of this invention.

In the simplified illustrative embodiment according to the principles of this invention shown in FIG. 1, a pair of electrodes 10*a* and 10*b* are oppositely disposed in electrical contact with a plate or sheet 11. The sheet 11 may advantageously be fabricated of an electrically conductive material having remanent magnetic properties such as the material known commercially as 4–79 Moly-Permalloy or another material having similar magnetic and electrical properties may be employed. Although the plate or sheet 11 has no necessary prescribed thickness, a sheet having a thickness of 0.00125 inch was found suitable for the practice of this invention. The electrodes 10*a* and 10*b* make contact with the sheet 11 at points, which for reasons will become apparent hereinafter, may be held to extremely small dimensions. The electrode 10*a* has provided thereon a terminal 12 and the electrode 10*b* is connected through a resistor 14 to ground. The electrode 10*b* is also connected to an output terminal 15.

It has been found that when a current pulse such as the positive current pulse 16 is applied to the terminal 12, the current passes to ground through the conductive sheet 11. The field generated by the current pulse 16 induces a remanent magnetic flux in the sheet 11. Since the field has its greatest intensity and therefore its maximum inductive effect at the portion of the sheet 11 where the current is also a maximum value, the density of the induced remanent flux is greatest in the portion of the sheet 11 between the electrodes 10*a* and 10*b* presenting the lowest impedance. If the sheet 11 is fabricated of an homogeneous, substantially solid magnetic material, the current path of lowest impedance will obviously be the most direct path between the points of contact of the electrodes 10*a* and 10*b*. However, in such a material other paths presenting progressively greater impedance will also exist between the two points of contact. Accordingly, the sheet 11 will also be remanently magnetized at those paths but in progressively diminishing intensity radially outward from the contact points. This flux concentration and its attenuation as the result of the positive current pulse 16 is symbolized in the drawing by the attenuating lines *f*.

When, as in the case of the specific embodiment being described, the magnetic material of the sheet 11 displays a substantially rectangular hysteresis characteristic, the embodiment of FIG. 1 provides a novel information storage device. The remanent magnetization represented by the lines *f* on the sheet 11 may advantageously be determined as representative of the binary information bit "1." If a binary "0" was to be stored, the polarity of the current pulse 16 would have been reversed thereby to induce a remanent magnetization of a direction opposite to that representative of a binary "1."

Readout of the stored information bit may be accomplished by the application of an interrogation voltage pulse opposite in polarity to that of the pulse 16, such as the negative voltage pulse 17. Since the impedance across the electrodes 10*a* and 10*b* presented to the pulse 17 will determine the magnitude of the current flow during the application of the pulse 17, an effective means is provided for determining the character of the information bit stored in the sheet 11. Thus, if the magnetization of the sheet 11 is in a direction opposite to that in which the current caused by the interrogation voltage pulse 17 tends to drive it, that is, representative of a binary "1," a relatively large impedance will be presented to this current.

On the other hand, if the magnetization is already in the magnetic state to which the current caused by the interrogation pulse 17 tends to drive it, that is, representative of a binary "0," a relatively smaller impedance will be presented. The difference in magnitude of the current flow between the electrodes 10*a* and 10*b* during the application of the voltage pulse 17 thus presents an advantageous means for detecting the character of the information bit stored in the sheet 11. The different current values are readily detected at the output terminal 15 by suitable detecting circuitry not shown in the drawing.

The points of contact of the electrodes 10*a* and 10*b* with the sheet 11 may be reduced to extremely small dimensions with the result that the magnitudes of the flux inducing current pulses may also be reduced to values not hitherto possible in magnetic switching arrangements. If the sheet 11 is fabricated of a magnetic material exhibiting conventional linear hysteresis characteristics, the embodiment of this invention depicted in FIG. 1 advantageously serves as an inductor which saturates responsive to an extremely low current magnitude if the points of contact of the electrodes 10*a* and 10*b* are also held to very small dimensions. Such an inductor element, because of the small area of the sheet 11 required for saturation, would serve a highly useful role in microcircuitry, for example.

Figure 2:
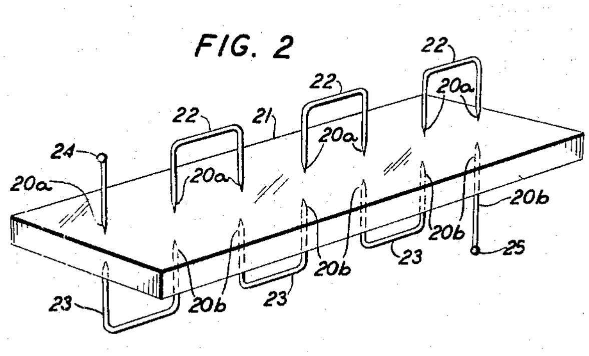
FIG. 2 depicts another specific illustrative embodiment of this invention comprising an inductor element adapted from a number of the devices of FIG. 1.

Another inductor element organized in accordance with the foregoing embodiment of this invention is depicted in FIG. 2. In this embodiment the inductance of the inductor element is adjusted by adjusting the number of connected electrodes in point contact with the magnetic conductive sheet. Thus, in the embodiment of FIG. 2, a plurality of pairs of electrodes 20*a* and 20*b* are oppositely disposed in electrical contact with a strip sheet 21. The sheet 21 is also of a magnetic material having the property of electrical conductivity and exhibiting conventional linear hysteresis characteristics. The electrodes 20*a* and 20*b* are interconnected by conductive bridging means 22 and 23, respectively, such that the portions of the sheet 21 between contact points of the electrodes 20*a* and 20*b* are serially connected. The electrodes 20*a* and 20*b* and the contact portions of the sheet 21 thus present a series current path between a terminal 24 provided on an electrode 20*a* at one end of the strip sheet 21 and a terminal 25 provided on an electrode 20*b* at the other end of the strip sheet 21. Obviously such an inductor element may also be realized by interposing separated and individual conductive magnetic material between the electrode points without resort to a continuous strip sheet. As a current is applied across the terminals 24 and 25, a magnetic flux is induced in the strip sheet 21 at the contact points of the electrodes 20*a* and 20*b*, which flux will conventionally vary to saturation as the applied current varies. The inductor element of FG. 2 exploiting conductive magnetic material thus provides an advantageous means for realizing inductances of varying values for extremely low level currents.

Figure 3:
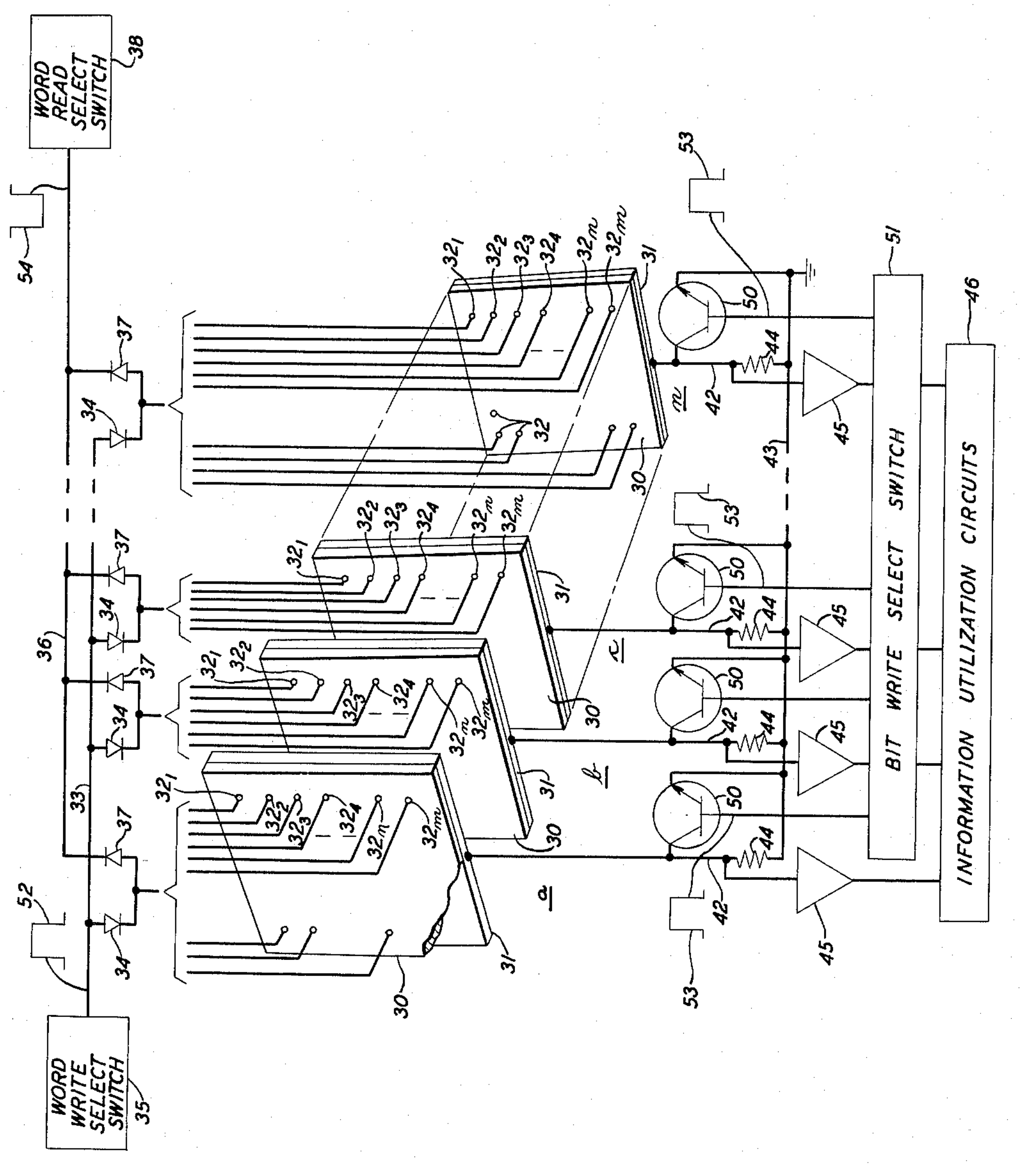
FIG. 3 depicts an illustrative multiplane coordinate memory array embodying the principles of this invention.

Another embodiment of this invention is shown in FIG. 3 and comprises a multiplane coordinate memory array. The memory array, which is organized on a binary information word basis, comprises a plurality of planes *a, b, c,* and *n*, each of which in turn comprises a memory sheet 30 having a ground plate 31 in electrical contact therewith. In order to provide memory capability, the sheets 30 are of a magnetic material exhibiting substantially rectangular hysteresis characteristics and may also be of the 4–79 Moly-Permalloy material mentioned in connection with the embodiment of FIG. 1. The ground plates 31 are of an electrically conductive material such as copper and are so associated with the memory sheets 30 as to provide electrical contact over the entire contact surfaces. On the surface of each of the memory sheets 30, opposite to the surface in contact with the ground plate 31, are plated or otherwise affixed in electrical contact, a coordinate array of electrodes 32, only representative ones of which are shown in FIG. 3. The electrodes 32 define information bit addresses on the portions of the memory sheets 30 to which they are affixed and the memory is so arranged that corresponding electrodes 32 of the memory sheets 30 define the corresponding bit address of the binary words which may be stored in the memory.

Each of the groups of corresponding electrodes 32 of the memory planes *a, b, c,* and *n* defining an information word are parallelly connected to a a common word write conductor. Thus, a common word write conductor is provided for each of the information word rows defined in the multiplane array. The plurality of common word write conductors are represented in FIG. 3 by the single conductor 33 in order to avoid undue complexity in depicting the wiring details. In each case the connection is made to the individual common conductors 33 from the corresponding electrodes 32 through a unilateral conducting element 34 which element 34 is poled to pass a write pulse of a polarity to be described. Each of the common word write conductors 33 is thus connected by means of parallel write bit branch circuits to the electrodes defining the bits of a word row. It will be apparent that the common write conductors 33 present at their other termini a coordinate arrangement corresponding to the coordinate array of electrodes 32 affixed to the memory sheets 30. The common write conductors 33 are connected at the other termini to a word write select switch 35, which switch 35, because of the correspondence of the conductors 35 to the coordinate arrangement of the information addresses on the memory sheets 30, may advantageously comprise a matrix switch of a character well known in the memory circuit art. The switch 35 is adapted to provide write pulses of a character and magnitude to be more specifically described hereinafter and, since the details of the switch 35 are not essential to an understanding of the principles of this invention, it is shown generally in block symbol form only.

Each of the groups of corresponding electrodes 32 of the memory planes *a, b, c,* and *n* defining an information word are also parallelly connected to a common read conductor in the manner described for the common write conductors 33. Thus, a common read conductor is provided for each of the information word rows defined in the multiplane array. In order to avoid undue complexity in the depicting of wiring details, the common read conductors 36 are represented in FIG. 3 by the single conductor 36. In each case the connection is made to the individual common conductors 36 through a unilateral conducting element 37 which element 37 is also poled to pass current of a polarity to be described hereinafter. Each of the common word write conductors 36 is thus connected by means of parallel read bit branch circuits to the electrodes defining the bits of a word row. In connection with the common conductors 36 it will also be apparent, as was the case with the write conductors 33, that the conductors 36 present at their other termini a coordinate arrangement corresponding to the coordinate arrays of electrodes 32 affixed to the memory sheets 30 and the arrays of bit addresses defined thereby. The conductors 36 are connected at these other termini to a word read select switch 38, which switch 38, because of the correspondence of the conductors 36 to the coordinate arrangement of information bit addresses, may advantageously also comprise a matrix switch similar to the switch 35. The switch 38 is adapted to provide read pulses of a character and magnitude to be more specifically described hereinafter, and since the details of such a switch 38 are also not essential to an understanding of the principles of this invention, it is also shown generally in block symbol form only.

Each of the ground plates 31 of the planes *a*, *b*, *c*, and *n* is connected by means of a conductor 42 to a ground bus 43 via a load resistor 44. The ground plates 31 are also each connected via the conductor 42 at the ungrounded end of the resistor 44 to an output detection amplifier means 45. Outputs of the latter amplifier means 45 are connected to information utilization circuits 46. The amplifier means 45 and the latter information utilization circuits 46 may comprise components of the information handling system of which this embodiment of the invention may advantageously comprise part. Since these circuits are readily envisioned by one skilled in the art they also need be shown in block symbol form only to obtain an understanding of this invention. Each of the ground plates 31 is also connected via the conductor 42 to the ground bus 43 through a transistor gating means 50. Each of the transistors 50 has its collector connected to a conductor 42 at the ungrounded end of a resistor 44 and has its emitter connected directly to the ground bus 43. Each of the transistors 50 has its base connected to a bit select switch 51. The latter switch 51 may also comprise circuitry well known in the art capable of selectively providing write pulses of the character and magnitude also to be more specifically described hereinafter. It is evident from the foregoing organization of the embodiment of FIG. 3 that a plurality of write and read circuits may be traced from the word write select switch 35 and the word read select switch 38 to the ground bus 43 and the information utilization circuits 46, respectively. Thus, a write circuit may be traced from the write select switch 35 to the ground bus 43 via a common word write conductor 33, any one of the parallel bit branch circuits including a unilateral conducting element 34, an electrode 32, a memory sheet 30, a ground plate 31, a conductor 42, and the collector and emitter of a transistor gating means 50. In a similar manner, a read circuit may be traced from the read select switch 38 to the information utilization circuits 46 via a common word read conductor, any one of the parallel bit branch circuits including a unilateral conducting element 37, an electrode 32, a memory sheet 30, a ground plate 31, a conductor 42, and an output detection amplifier 45.

An information bit is stored in the memory sheets 30 of the embodiment of FIG. 3 in the manner as was also described in connection with the embodiment of FIG. 1 when the latter embodiment is employed as an information storage device. Thus when a current pulse is applied to any one of the electrodes 32 of the memory sheets 30, the current pulse passes to ground through the conductive memory sheet 30 via the ground plate 31 when a circuit to ground is closed. The field produced by the applied current pulse induces a remanent magnetization in the portion of the memory sheet 30 within the effective influence of the field in a circular direction which may be determined as representative of a binary "1." The electrodes 32 and the ground plates 31 of the embodiment of this invention depicted in FIG. 3 thus correspond in function and operation to the electrodes 10a and 10b of the embodiment of FIG. 1.

With this introduction, an illustrative write-read cycle of operation of the embodiment of FIG. 3 may now be described. For purposes of description it will be assumed that an exemplary binary word 1, 0, 1, . . . 1 is to be written into the word row defined by the electrodes $32_2$ of the memory sheets 30. It will further be assumed that prior to the write operation to be described, each of the bit address portions of the memory sheets 30 is in a magnetic state opposite to that to which a write current pulse will tend to drive it as the result of a previous read operation. In accordance with conventional practice the latter magnetic state will be representative of a binary "0" or it may correspond to a cleared state of a bit address.

The foregoing exemplary binary word is written into the word row defined by the electrodes 32 by the selection of the common write conductor 33 associated with the word row and the application thereto of a positive write voltage pulse 52 by the word write select switch 35. This voltage pulse 52 will cause current to divide equally among those branches leading to the electrodes $32_2$ which present a closed circuit through the ground plates 31 to the ground bus 43. By controlling the continuity of the write bit branch path from the selected common write conductor 33 the character of the information bit being written into the exemplary word row is controlled. Thus, in accordance with the foregoing exemplary word, the write bit branch circuit including the memory sheet 30 and ground plate 31 of the plane *b* is maintained open during the application of the write voltage pulse 52. The continuity of the write bit branch circuits is controlled by selectively controlling the conductive state of the gating transistor means 50. This is accomplished by applying a positive current pulse 53 to the base of those transistors 50 which are to be in a conductive state coincidentally with the application of the voltage pulse 52 to the selected conductor 33. Thus, positive current pulses 53 are applied to the transistor gating means 50 associated with the planes *a*, *c*, and *n* from the bit write select switch 51. With the latter transistor gating means 50 in a conductive state, closed circuit paths are presented therethrough for the write bit branch circuits including the address portions of the memory sheets 30 which are to contain the binary "1's." The current pulses 53 pass to the ground bus 43 along the low impedance path presented by the transistor gating means 50. The value of the load resistors 44 is selected so that sufficiently high impedance is presented therethrough effectively to block this path to the ground bus 43. The transistor gating means 50 associated with the plane *b*, the address portion defined by the electrode $32_2$ of which is to contain a binary "0," is left unconductive and thus a high impedance is presented to any write current pulse attempting to travel along the conductor 42 to ground.

As a result of the voltage pulse 52 producing currents in each of the write branch circuits leading to the memory planes *a*, *c*, and *n*, a remanent magnetization representative of a binary "1" is induced in each of the address portions defined thereon by the electrodes $32_2$. Since no write current pulse is present in the write bit branch circuit leading to the memory plane *b*, the information address portion of the memory sheet 30 defined by the electrode $32_2$ thereon is left in the cleared or "0" magnetic state. It will be appreciated that in the write operation just described none of the conventional coincident current amplitude limitations are encountered. Thus, although a coincidence of the pulses 52 and 53 is required to write a binary "1" in a word row, no upper limit is set for these pulses. The write pulse 53 is employed only to control the continuity of the write bit branch circuits leading to the information addresses and advantageously does not perform a flux switching function. With the binary bits of the exemplary word introduced into the word row defined by the electrodes $32_2$ of the memory planes as described in the foregoing, an illustrative read operation of a write-read cycle of the embodiment of FIG. 3 may now be described.

A read operation is initiated by the application of a negative real voltage pulse 54 from the word read select switch 38 to the common read conductor 36 associated with the word row to be interrogated. In the present illustrative case, the common read conductor 36 having read bit branch circuits including the electrodes $32_2$ of the memory sheets 30, is thus energized. During the read operation no enabling pulses are applied to the transistor gating means 50. Accordingly, the paths presented therethrough remain open circuited and the only paths presented to currents in the read bit branch circuits by the voltage pulse 54 will be through the output load resistors 44. The voltage pulse 54 will be applied across the read bit branch circuits to ground with the currents caused in those circuits dividing as determined by the individual impedances presented in those circuits. As was described in connection with the embodiment of FIG. 1, the impedance of a read bit circuit is determined in turn by the particular remanent magnetic state of the information address portion of a memory sheet 30 included in the branch circuit. Since the read voltage pulse 54 is negative in polarity, the current caused thereby in the branch circuits will be in a direction to switch the remanent magnetizations of the information addresses which are representative of binary "1's." A relatively high impedance is thus presented in the latter branch circuits when compared with the impedance presented in those branch circuits in which the information address is already in the magnetic state to which the read current tends to drive it.

Accordingly, output signals having amplitudes in accordance with the character of the stored bits of the interrogated word row are available at the ungrounded end of the output load resistors 44. Specifically, in accordance with the exemplary word being read, signals of relatively low amplitude will be transmitted from the load resistors 44 associated with the memory planes *a*, *c*, and *n*, to the associated detection amplifiers 45, which signals will be indicative of the binary "1's" stored in the exemplary word row defined by the electrodes $32_2$. A signal of relatively high amplitude will be transmitted from the output load resistor 44 associated with the plane *b* to the associated detection amplifier 45 indicative of the binary "0" stored in the exemplary word row. These output signal conditions, after amplification by the amplifiers 45, will be simultaneously transmitted from the outputs of the amplifiers 45 to the information utilization circuits 46. The disparity in signal amplitudes will continue until each of the information address portions of the memory sheets 30 which contained binary "1's" have been switched to the clear magnetic state at which time the impedances presented in the read bit branch circuits will be equal. It will be appreciated that during the read operation also, no upper limit is set for the magnitude of the read voltage pulse 54. Since the read pulse 54 is applied only to the word row being interrogated, the information bits stored in the other addresses of the memory sheets 30 are left magnetically undisturbed.

Although in the aforedescribed write-read cycle of operation the selective access to a single exemplary word row was contemplated it will be understood that access to the word rows of the memory planes may be had sequentially for both writing and reading purposes. Thus, for example, in an exemplary application of the memory array of FIG. 3, the control of the write select switches 35 and 51 and the read select switch 38 may be provided by clock and other associated timing control circuitry. Since such control circuits comprise components not essential to an understanding of the principles of this invention and its practice they are not shown in the drawing. Although a multiplane memory array is shown in FIG. 3, this embodiment may advantageously comprise a single plane array. In this case, for example, each of the memory sheets 30 would comprise a strip having affixed thereon only the electrodes $32_1$ through $32_m$, which latter electrodes would also define the word rows of the single plane array.

Figures 4A, 4B:
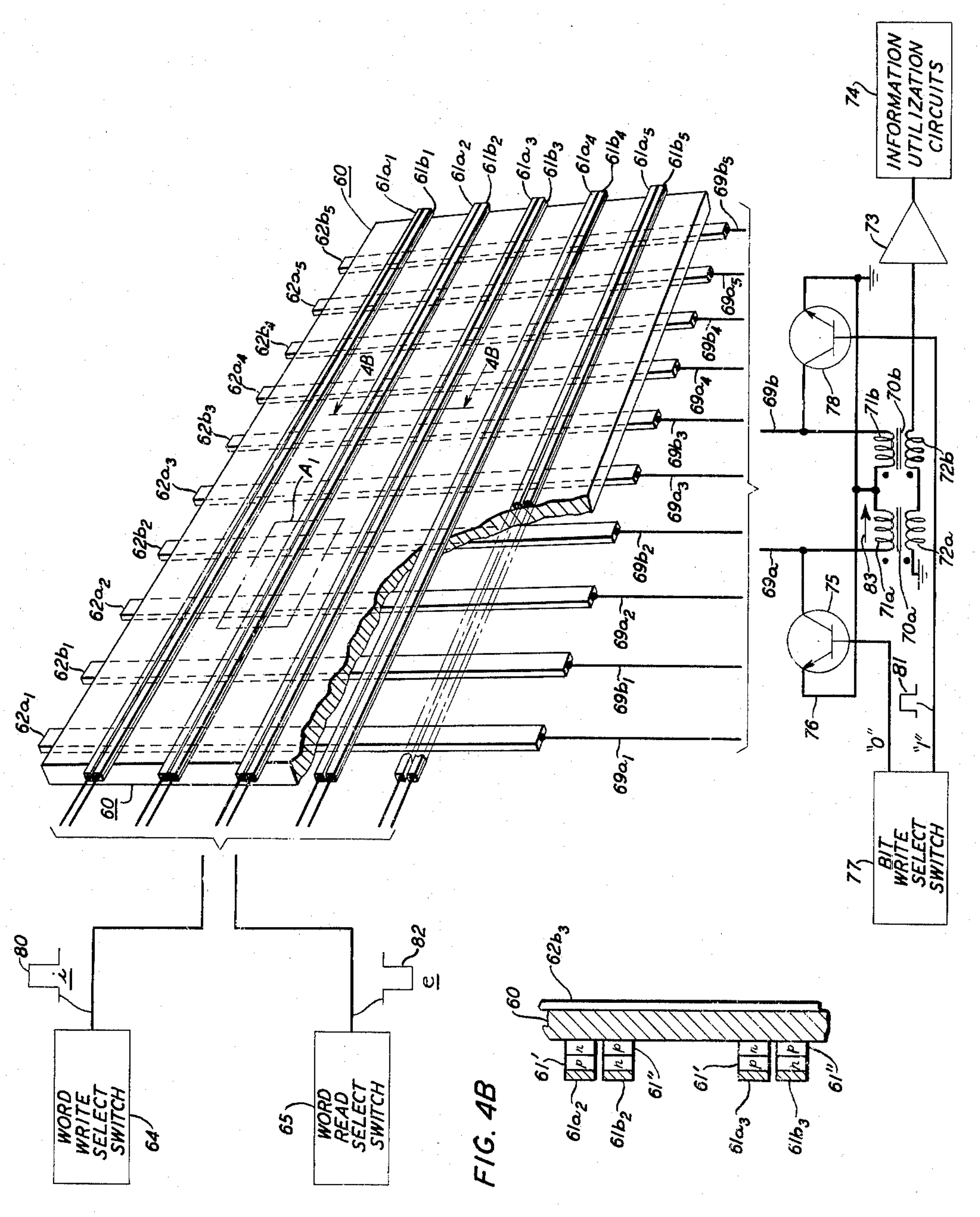
FIG. 4A depicts another specific memory array according to the principles of this invention.
FIG. 4B is a partial section view taken along the line 4B—4B of FIG. 4A.

Another memory arrangement embodying the principles of this invention is depicted in FIGS. 4A and 4B and comprises an electrically conductive memory sheet 60 having square loop magnetic properties as described in connection with the embodiment of FIG. 3. The electrodes of the embodiment of FIG. 4 according to the principles of this invention comprise parallelly arranged strips plated or otherwise affixed in electrical contact on each side of the memory sheet 60. Thus, on one side of the sheet 60 a plurality of pairs of electrically conducting strip electrodes $61a_1$ and $61b_1$ through $61a_5$ and $61b_5$ are electrically connected to the sheet 60 via layers of p–n and n–p semiconductor material. Specifically the strip electrodes 61*a* are electrically connected to the sheet 60 via a layer of p–n semiconductor material 61′ and the strip electrodes 61*b* are electrically connected to the sheet 60 via a layer of n–p semiconductor material 61″. On the opposite side of the sheet 60 another plurality of electrically conducting strip electrodes 62 are affixed directly thereto transversely to the strip electrodes 61*a* and 61*b*. The strip electrodes 62 are grouped in pairs 62*a* and 62*b* in a series $62a_1$ through $62a_5$ alternating with a series of strip electrodes $62b_1$ through $62b_5$. The physical relationship of the strip electrodes 61*a* and 61*b*, the semiconductor layers 61′ and 61″, the sheet 60, and the strip electrodes 62 is depicted more clearly in FIG. 4B. The latter figure is a fragmentary cross-sectional view taken along the lines 4B of the view of FIG. 4A. Each of the strip electrodes 61*a* terminates at one end in a word write select switch 64 and each of the strip electrodes 61*b* terminates in a word read select switch 65. In order to simplify the presentation of the embodiment of FIG. 4, only single representative such connections are shown in the drawing.

The strip electrode pairs $69a_1$ and $62b_1$ through $62a_5$ and $62b_5$ terminate at one end in conductor pairs $69a_1$ and $69b_1$ through $69a_5$ and $69b_5$, respectively. Each of the conductors 69*a* is connected to one of transformer primary winding 71*a* of an individual transformer 70*a*. Each of the conductors 69*b* is connected to one end of a transformer primary winding 71*b* of an individual transformer 70*b*. Each of the other ends of the primary windings 71*a* of the transformers 70*a* is connected to the other end of a primary winding 71*b* of a transformer 70*b* and this point is connected to ground bus 76. Also to avoid undue complexity in depicting the embodiment of FIG. 4, only a single representative pair of transformers 70 is shown in the drawing. The secondary windings 72*a* and 72*b* of the transformer pairs 70*a* and 70*b* are connected together in series between ground and individual respective detection amplifiers 73, the output of each of which amplifiers 73 is in turn connected to information utilization circuits 74. The conductors 69*a* are also each connected to the collector of a transistor gating means represented in the drawing by the single transistor gating means 75. The emitters of the gating means 75 are also connected to the ground bus 76. The bases of the transistor gating means 75 are connected to individual outputs of a bit write select switch 77 which outputs provide in the case of the gating means 75, positive enabling pulses representative of binary "0's." The coductors 69*b* are also each connected to the collector of a transistor gating means represented in the drawing by the single transistor gating means 78. The emitters of the gating means 78 are connected to the ground bus 76. The bases of the transistor gating means 78 are connected to individual outputs of the bit write select switch 77, which outputs provide in the case of the gating means 78, positive enabling pulses representative of binary "1's." Since the access circuitry comprising the switches 64, 65, 74, and 77 is readily envisioned by one skilled in the art and does not comprise components of which a detailed description is necessary in order to understand the principles of this invention and its practice, these switches are shown in block symbol form only and need be described only with respect to the character of the pulses provided thereby. The latter pulses will be generally described in connection with an illustrative operation of the embodiment of this invention to be described hereinafter. The output detection amplifiers 73 may also comprise circuitry suitable for the purpose to be described, which circuitry is also readily available to one skilled in the art.

The memory circuit of FIG. 4 is organized on a binary information word basis with each pair of the strip electrode pairs 61*a* and 61*b* defining a word row. The memory circuit is further organized such that either one of two portions of the memory sheet 60 defined by the intersecting strip electrodes 61 and 62*a* and 62*b* is employed to store a binary information bit. The memory sheet 60 is shown as broken away in FIG. 4A more clearly to show the intersection of the strip electrodes 61 and 62 and the interposed sheet 60. An exemplary information address capable of storing a single binary bit is thus outlined in the drawing at $A_1$ and is defined by the intersecting word strip electrode pair 61$a_2$ and 61$b_2$ and the bit strip electrodes 62$a_2$ and 62$b_2$. The strip electrode pairs, such as the pair 61$a_2$ and 61$b_2$, are associated together to define the word rows, the strip electrode 61*a* acting in each case as the write electrode and the strip electrode 61*b* acting in each case as the read electrode. It is thus clear that, in accordance with the principles of this invention, a current path may be traced from the word write select switch 64 to the ground bus 76, via the word strip electrode 61$a_2$, a p-n semiconductor strip 61′, the memory sheet 60, the bit strip electrode 62$a_2$, conductor 69$a_2$, and the collector and emitter of a transistor gating means 75. This current path may alternately be traced via the bit strip electrode 62$b_2$, conductor 69$b_2$, and the collector and emitter of a transistor gating means 78. A memory arrangement is thus presented in which the conductive memory sheet 60 provides a coordinate array of remanently magnetizable, electrically conductive portions between the intersecting strip electrodes 61 and 62. In a similar manner, current paths may be traced from the word read select switch 65 to the ground bus 76 via any one of the word strip electrodes 61*b*, a p-n semiconductor strip 61″, the memory sheet 60, any one of the bit strip electrodes 62*a* or 62*b*, and the junction of windings 71*a* and 71*b* of a transformer pair 70*a* and 70*b*.

An illustrative write-read cycle of operation of the embodiment of FIG. 4 is initiated by the selection of one of the word strip electrodes 61*a* of the electrode pairs 61*a* and 61*b* by the word write select switch 64 and the application of a positive current pulse 80 to the strip electrode 61*a* thus selected. For purposes of illustration it will be assumed that a binary information word is to be written into the word row defined by the word strip electrode pairs 61$a_2$ and 61$b_2$. Accordingly, the current pulse 80 is applied to the write strip electrode 61$a_2$. Simultaneously with the application of the current pulse 80 to the selected strip electrode 61$a_2$, current paths are completed to the ground bus 76 by enabling pulses selectively applied to the bases of the gating transistor means 75 or 78. Thus, with respect to each pair of strip electrodes 62*a* and 62*b* defining the bits of the information word rows, either the associated transistor gating means 75 or the transistor gating means 78 is enabled thereby providing a path to the ground bus 76 in each case as determined by whether a binary "1" or a "0" is to be introduced into an information address. For purposes of illustration the write operation will be demonstrated with respect to only the information address $A_1$ outlined in the drawing. It will further be assumed that a binary "1" is to be written into this address. The bit write select switch 77 is therefore controlled to apply a positive pulse 81 to the base of the transistor gating means 78 controlling the continuity of the current path including the word strip electrode 61$a_2$ and the bit strip electrode 62$b_2$ of the electrode pairs 62*a* and 62*b* defining the information address $A_1$ in the word row under consideration. The current pulse 80 as a result is conducted via the path including the latter elements and the memory sheet 60 to induct a remanent magnetization in the latter sheet at the intersection of the electrodes 61$a_2$ and 62$b_2$. This magnetization is determined as being representative of a binary "1." Since no curent was conducted to the bit strip electrode 62$a_2$, which electrode also defines the information address $A_1$, the magnetic state of the memory sheet 60 at the intersection of the strip electrode 61$a_2$ and the bit strip electrode 62$a_2$ will remain in the condition to which it was driven by a previous read-out operation. This condition, as previously mentioned herein, will be opposite to that of the magnetic state just written as a binary "1."

The selection of current paths through the bit strip electrodes 62*a* and 62*b* of each of the other electrode pairs defining the bit addresses of the word being written are controlled in a similar manner by the bit write select switch 77 in accordance with the character of the binary bit to be written into each of the addresses. This control, of course, is also accomplished coincidentally with the application of the write current pulse 80 to the word strip electrode 61$a_2$. The write current pulse 80 thus divides between one of each of the electrode pairs 62*a* or 62*b* to introduce the binary bits of the word to the word row. If a binary "0" was to be written into the illustrative information address $A_1$, the bit write select switch 77 would have been controlled to apply an enabling pulse to the base of the transistor gating means 75. A current path would in this case have been closed through the bit strip electrode 62$a_2$ and the remanent magnetization of the portion of the memory sheet 60 at the intersection of the latter electrode and the word strip electrode 61$a_2$ would have been switched from the cleared state. The memory sheet 60 would then have been remanently magnetized in directions opposite to the conditions described in the foregoing for the storage of a binary "1."

An illustrative interrogation of the embodiment of FIG. 4, may also be described in connection with the exemplary word row defined by the word strip electrode pairs 61$a_2$ and 61$b_2$. A negative voltage pulse 82 is selectively applied from the word read select switch 65 to the read electrode 61$b_2$. At this time none of the transistor gating means 75 or 78 are enabled thus presenting an open circuit in each of the current paths aforedescribed to the ground bus 76. However, alternate current paths including the read strip electrode 61$b_2$ and each of the bit strip electrodes 62*a* and 62*b* are provided through the primary windings 71*a* and 71*b* of the transformers 70*a* and 70*b*, respectively, to the ground bus 76. The current caused by the read voltage pulse 82 is accordingly conducted via a n-p semiconductor strip 61″, the memory sheet 60, and either one of the bit strip electrodes 62*a* or 62*b* for each bit address as determined by the impedance presented by the memory sheet 60 in each case. The particular electrode 62*a* or 62*b* selected by the current will also determine in which primary winding 71*a* or 71*b* of the associated transformers 70*a* and 70*b* the current will pass. In the case of the exemplary information address $A_1$, the path of lowest impedance will be presented by the portion of the memory sheet 60 at the intersection of the word strip electrode pairs 61$a_2$ and 61$b_2$ and the bit strip electrode 62$a_2$ since the remanent magnetization at that point is already in the direction to which the current tends to drive it as previously explained. As a result, the negative current passes to the ground bus 76 in the direction as indicated by the arrow 83 in the primary winding 71*a* of the transformer 70*a* associated with the information address $A_1$. A positive output voltage signal is transmitted as a result of the sense of the windings 71*a* and 72*a* to the output detection amplifier 73 and thence to the information utilization circuit 74, which positive output signal is indicative of the storage in the informaton address $A_1$ of a binary "1." It will be appreciated that as the read voltage pulse 82 continues, the magnetic state of the memory sheet 60 at the intersection of the word strip electrode pairs $61a_2$ and $61b_2$ and the bit strip electrode $62b_2$ is eventually reversed. At that time the current induced by the read voltage pulse 82 will divide equally between the two paths presented by the bit strip electrodes $62a_2$ and $62b_2$. The portions of the sheet 60 defined by the latter intersecting electrodes are thus restored to the cleared magnetic state preparatory to the introduction of another binary bit therein.

If a binary "0" had been stored in the address $A_1$ the impedance conditions of the intersections in the memory sheet 60 of the word electrode pair $61a_2$ and $61b_2$ and the bit strip electrodes $62a_2$ and $62b_2$ would be reversed whereupon the current would pass to the ground bus 76 through the bit strip electrode $62b_2$. The output voltage signal generated across the secondary winding 72*b* of the associated transformer 70*b* in this case would be of opposite polarity and this signal transmitted to the information utilization circuits 74 via an output detection amplifier 73 would be indicative of the storage in the information address $A_1$ of a binary "0." Readout of the other information addresses defined by the word strip electrode pair $61a_2$ and $61b_2$ is accomplished simultaneously with the readout of the information address $A_1$ in a manner identical to that described in the foregoing. The output signals indicative of the stored bits generated across the secondary windings 72 of each of the associated transformers 70 will also be transmitted via respective output detection amplifiers 73 to the information utilization circuits 74. It will be appreciated that, during both the write and read phase of operation, the load variation as seen by the word write and read select switches 64 and 65 is advantageously independent of the character of the binary information bits stored in the information addresses.

The p-n and n-p semiconductor strips 61′ and 61″ comprising parts of the word strip electrode pairs 61*a* and 61*b*, respectively, advantageously provide an isolation function during the writing and reading operations. Thus, by permitting conduction in only one direction during either operation sneak paths through unselected electrodes are effectively precluded.

Figure 5:
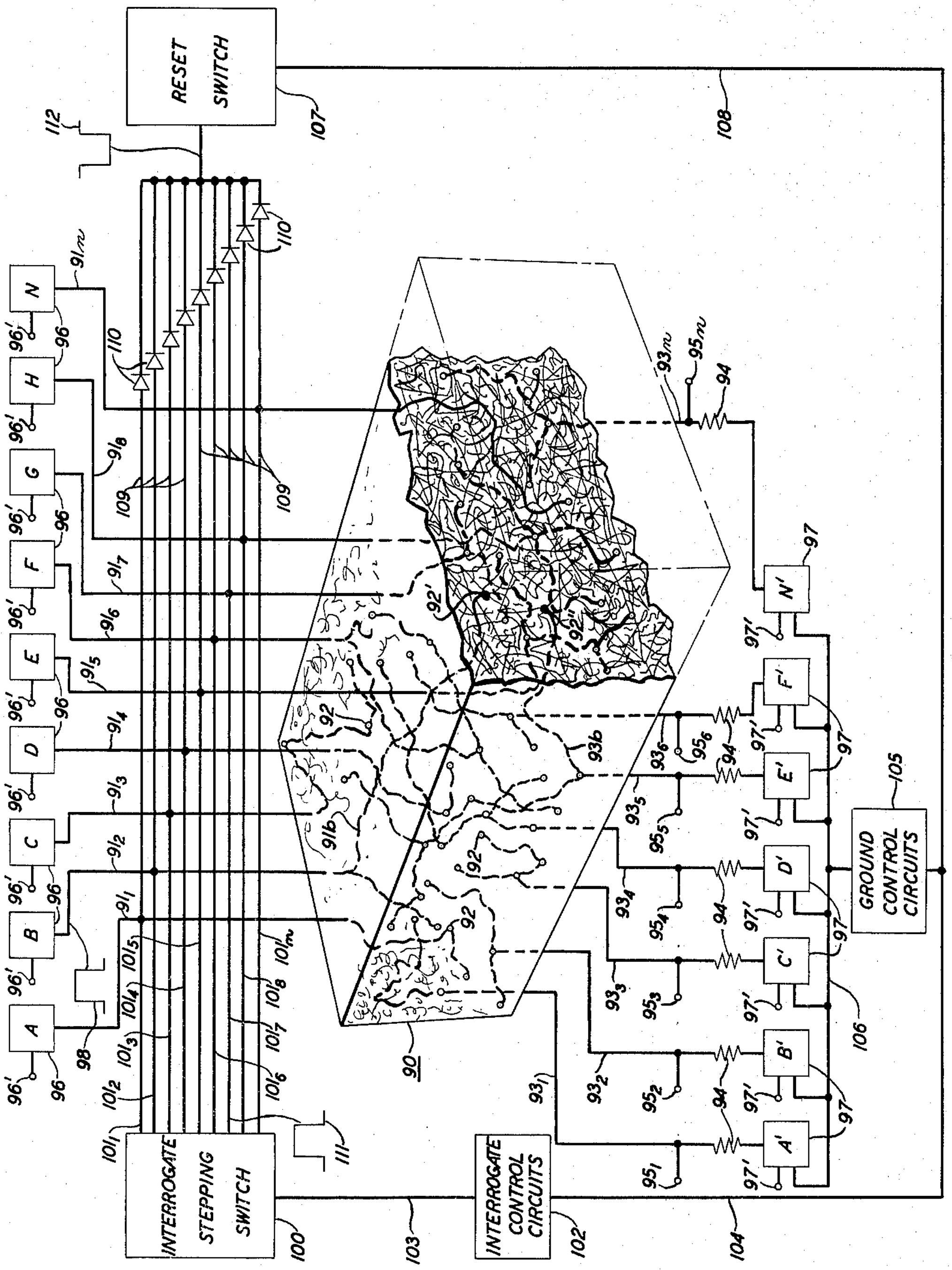
FIG. 5 depicts an illustrative embodiment of this invention comprising a comparison circuit for establishing the correlation between two groups of random occurrences.

In FIG. 5 is shown another embodiment of the principles of this invention comprising a novel memory arrangement for establishing correlations between groups of signal sources. The magnetic medium in this embodiment comprises a solid of electrically conductive, magnetic strands interwoven in a completely random fashion to realize a densely packed memory pad 90. The strands may also be fabricated of the 4–79 Moly-Permalloy magnetic, electrically conductive material having substantially rectangular hysteresis characteristics referred to previously herein. In practice strands having a diameter range, for example, between 0.0001 and 0.01 inch will provide suitable impedance and flux switching characteristics. The randomly packed and interwoven strands in the pad 90 will be in physical contact at a large number of undetermined points and an electric current applied at one point would obviously be conducted to a ground point through a large number of undetermined parallel current paths presented by the interwoven strands. Interwoven with the magnetic strands and inserted at one side of the memory pad 90 are a plurality of probes $91_1$ through $91_n$. Each of the probes 91 is electrically insulated from each other and from the magnetic strands of the memory pad 90 except for one or more electrodes 92 affixed thereon making electrical contact with the strands at also wholly random points within the pad 90. The probes 91 may also be branched within the pad 90 in order to provide access from the entering side of the pad to substantially every area therein. Also interwoven with the magnetic strands and inserted at the other side of the memory pad 90 are a second plurality of probes $93_1$ through $93_m$. Each of the probes 93 is also electrically insulated from each other and from the magnetic strands of the memory pad 90 except for one or more electrodes 92 affixed thereon and in electrical contact with the strands at also wholly random points with the pad 90. The probes 93 may also be branched as are the probes 91 to provide access also from the entering side of the probes 93 to substantially every area of the pad 90. The memory pad 90 is shown as irregularly broken in FIG. 5 more clearly to show the internal organization of exemplary ones of the probes 91 and 93, their branches, and the affixed electrodes 92.

Each of the probes 93 has connected at the other end thereof an output load resistor 94 and is also connected to an output terminal 95. The other ends of the probes 91 are connected to a first group of pulse sources 96. Thus, the probes $91_1$ through $91_m$ are connected to pulse sources 96 specifically designated A through N, respectively. The other ends of the resistors 94 are connected to a second group of pulse sources 97. Thus, the resistors 94 connected at one end to the probes $93_1$ through $93_m$ are connected at the other ends to pulse sources 97, specifically designated A′ through N′, respectively. The probes 91 and 93 are also shown for these purposes as entering the pad 90 from opposite sides thereof. The principles of this invention however, contemplate any predetermined number of such probes entering the memory pad 90 from any side or angle whatever without regard to spacing, symmetry, or other order. Further, although the memory pad 90 is shown as being rectangular, the pad 90 may assume any shape or form whatever without affecting the principles of its operation.

Each of the probes 91 is also individually connected to an interrogate stepping switch 100 via a plurality of conductors $101_1$ through $101_n$. Interrogate control circuitry is further represented in connection with the embodiment of FIG. 5 by interrogate control circuits 102 connected by means of a conductor 103 to the interrogate stepping switch 100. During an interrogation operation the interrogate control circuits 102 also control, via a conductor 104, ground control circuits 105 which are in turn connected via a common conductor 106 to each of the sources 97. The interrogate control circuits 102 and ground control circuits 105 may comprise any control circuits of the system of which the embodiment of FIG. 5 may advantageously comprise a part which control circuits are readily envisioned by one skilled in the art. Accordingly, since these circuits are not necessary to an understanding of the principles of this invention and its practice they are shown in block symbol form only. The interrogate stepping switch 100 is adapted to apply sequentially, positive voltage pulses to the conductors 101 and thereby to the probes 91 in a manner and at a time to be described more specifically hereinafter.

Reset control circuitry is represented in FIG. 5 by a reset switch 107 which also provides control for the ground control circuit 105 via a conductor 108. The reset switch 107 is also adapted to provide a negative voltage pulse simultaneously to each of the probes 91 via a plurality of conductors 109 and isolating unilateral conducting elements 110. The reset switch 107 may also comprise a pulse generator readily available in the art which is operative responsive to clock or timing signals appearing in the system of which the embodiment of FIG. 5 may advantageously comprise a part. Accordingly, the switch 107 is also shown only in block symbol form.

The pulse sources 96 may advantageously comprise current pulse sources of any character well known in the art and, in accordance with an illustrative application of the embodiment of FIG. 5, the pulse sources 97 may comprise switching means capable of recurrently closing current paths to a ground potential therethrough. The sources 96 and 97 may advantageously be energized under the control of discrete occurrences within an information handling or data processing system, for example. For this purpose each of the pulse sources 96 and 97 is provided with an input terminal 96′ and 97′, respectively, on which terminals control signals may be applied. In such an application, the embodiment of FIG. 5 is highly useful in establishing the correlation between occurrences controlling the two groups of pulse sources 96 and 97. When such occurrences appear wholly at random for each of the two groups of sources 96 and 97, the particular occurrence in the first group which appears most frequently coincidently with a particular occurrence in the second group may readily be determined. The occurrences of each group which appear with lesser frequency of coincidence may also be readily determined by means of the memory device of FIG. 5.

For purposes of describing an illustrative operation of the embodiment of FIG. 5, it will be assumed that the pulse sources 96 are wholly randomly controlled to generate positive current pulses 98. At the same time the sources 97 are wholly randomly controlled to provide intermittent current paths to a ground potential for the pulse 98. By means of the memory pad 90 it will now be possible to establish which of the sources 96 is controlled coincidently with which of the sources 97 to provide coincident current and ground impulses with the greatest frequency. For further purposes of illustration it will be assumed that such a correlation exists between occurrences controlling the pulse source 96 designated B of the first group of sources and the pulse source 97 designated E′ of the second group of sources. At the first coincident occurrence of the pulse 98 and the ground pulse provided by the latter sources B and E′, respectively, a current path is provided via the probe $91_2$, some one of its branches and an electrode 92 affixed thereon, the memory pad 90, and an electrode 92 and branch of the particular probe 93 leading to the ground instantly being applied. Since a path to ground is at this instant being applied via the probe $93_5$, the current pulse 98 is conducted via the branch 91*b* of the probe $91_2$, its terminating electrode 92′, the magnetic strands of the memory pad 90 between the electrode 92″ terminating the branch 93*b* of the probe $93_5$, the latter probe and branch, and the resistor 94 connecting the latter probe with the ground-providing source E′.

Figure 6:
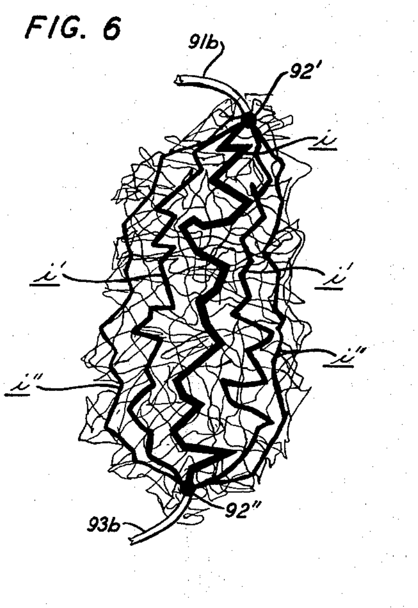
FIG. 6 is a fragmentary portion of the magnetic medium of FIG. 5 between particular electrodes, enlarged for purposes of describing an illustrative operation of the embodiment of FIG. 5.

The current pulse 98 will be conducted between the electrodes 92′ and 92″ through a plurality of parallel paths as presented by the random physical interconnections of the magnetic strands packed between these two electrodes. Since these physical interconnections are wholly random the specific identity of the parallel paths so presented is virtually unascertainable and in accordance with the principles of this invention need not be so ascertained. However, with the first coincidence of a current pulse 98 and a ground pulse applied from the sources B and E′, respectively, a particular path or paths of least resistance will be followed by the pulse 98 and some of the strands forming this path or paths will be partially magnetized while other such strands may be fully remanently magnetized. The paths so magnetized between the electrodes 92′ and 92″ are reperesented in FIG. 6, which depicts a fragment of the memory pad 90 between the latter electrodes. Thus the heavy erratic line *i* represents each of the current paths followed by the current pulse 98 between the electrodes 92′ and 92″ through the interconnected magnetic strands in which a full remanent flux is induced thereby. However, the current pulse 98 will also be divided among other parallel paths between the electrodes 92′ and 92″ presenting greater resistance. Accordingly, since the current along these paths will be of lesser magnitude, the magnetic strands will be only partially remanently magnetized and these paths are represented in FIG. 6 by the erratic lighter lines *i′*. It will also be appreciated that current paths of still greater resistance will be offered to the current pulse 98 in more remote strands between the electrodes 92′ and 92″. These paths, which will also be partially remanently magnetized but to a lesser degree than the paths *i′*, are represented in FIG. 6 by the erratic lines *i″*. At the termination of the current pulse 98 or at the termination of the coincidence of the pulse 98 and the ground pulse from the source E′, the strands between the electrodes 92′ and 92″ presenting the aforedescribed illustrative current paths will remain remanently magnetized in the degrees as also described in the foregoing. Because of the remanent properties of the magnetic strands these remanent magnetizations will remain regardless of whether or not other current paths are also remanently magnetized in the memory pad 90 between other electrode 92 pairs or whether or not any further coincidence occurs between a pulse 98 and a ground pulse from the sources B and E′, respectively. Since it may be presumed in the operation of the embodiment of FIG. 5, that other coincidences will occur between pulses from other sources 96 and 97, such remanent magnetizations will in fact be induced between other electrodes 92. In fact such remanent magnetizations may be induced between the electrode 92′ and any other electrode 92 associated with the probes 93 or between the electrode 92″ and any other electrode 92 associated with the probes 91 at the same time that the aforedescribed remanent magnetizations depicted in FIG. 6 exist.

At the second coincidence of a current pulse 98 from the source B and a ground pulse at the source E′, a low impedance path will be presented between the electrodes 92′ and 92″ and, as a result, more of the current paths, such as the paths *i′* will be remanently magnetized. With successive coincidences of current pulses 98 and ground pulses between the sources B and E′, the current paths existing between the electrodes 92′ and 92″ presented by the interconnected strands will be progressively fully remanently magnetized. Obviously from the aforedescribed magnetization process other current paths between electrodes 92 will also be remanently magnetized in varying degrees as the result of coincidence of current pulses 98 from the sources 96 and ground pulses from the sources 97. This progressive magnetization will be continued until such time as the correlation between the occurrences controlling the energization of the two groups of sources 96 and 97 is to be determined. By progressively remanently magnetizing the paths between the energized electrodes 92 as the result of repetitively applied current pulses 98, the absolute impedance between the electrodes 92 is also progressively decreased. Current paths are thus "learned" between the electrodes 92 as energizing pulses from the sources 96 and 97 are repetitively applied to the probes 91 and 93, respectively. The particular pairs of probes 91 and 93 which have been most frequently coincidently energized and those which have been coincidently energized with progressively less frequency may be determined at any time after a given series of random energizations of the sources 96 and 97, which time may be as set as an interrogation time.

This interrogation is accomplished under the control of the interrogate control circuits 102 which, by means of control pulses not specifically depicted in the drawing, operate to control the simultaneous energization of the interrogate pulse source 100 and the ground control circuits 105. The former source is adapted to provide sequential positive interrogate voltage pulses 111 to each of the probes $91_1$ through $91_n$ via the conductors $101_1$ through $101_n$, respectively. At the same time the ground control circuits 105 control via the common conductors 106 the simultaneous energization of the sources 97 to provide a ground for current induced by the voltage pulses 111. As a result of the voltage pulse 111 a read-out current will be induced in the current paths established in the memory pad 90 by the previously applied random coincident current pulses 98, which read-out current in the case of each current path will be of a magnitude as determined by the impedance of each path. The latter impedance in each case will have been set by the extent to which the magnetic strands comprising each path have been remanently magnetized. Thus, the current in each path will vary in accordance with the impedance presented in the paths.

Figure 7:
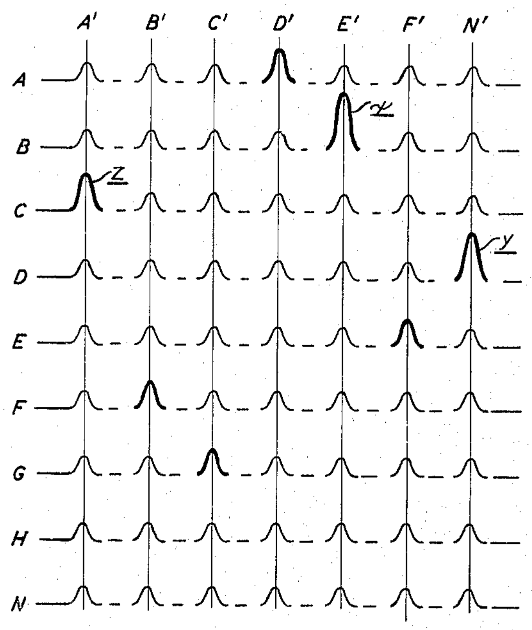
FIG. 7 is a comparison chart showing in idealized form output signals generated during an illustrative interrogation operation of the embodiment of FIG. 5.

The difference in current values in each path may readily be measured by simultaneously observing, by means of suitable detection amplifiers well known in the art, the output signals made available at the terminals 95 each time the voltage pulse 111 is applied to a probe 91. In the illustrative case described in the foregoing, the signal of greatest magnitude will appear at the output terminal $95_5$ at the time the voltage pulse 111 is applied to the conductor $101_2$ and thereby to the probe $91_2$. This follows since, as was explained in the foregoing, the current caused by the pulse 111 sees the least impedance in the memory pad 90 between the electrodes 92' and 92'' completing a current path between the sources B and E'. In FIG. 7 is shown a typical panel of output signals resulting from the sequential scanning of the probes $91_1$ through $91_n$ associated with the sources A through N, respectively. Thus, the idealized output signals appearing for an illustrative interrogation cycle at each of the terminals 95 associated with the sources A' through N' are depicted in the rows, the columns indicating the sequence in which the probes 91 associated with the sources A through N are interrogated. By inspection it may be seen that the current of the greatest magnitude occurs between the sources B and E', this current being symbolized by the waveform $x$. For purposes of illustration the next greatest current magnitude during the interrogation cycle is shown as occurring between the sources D and N' and is indicated by the waveform $y$. Other current magnitudes may also be observed in a descending order of magnitude, the next succeeding current value being shown, for example, as occurring between the sources C and A' and indicated as the waveform $z$. Obviously a source 96 such as the source B could also have been energized coincidently in another order of frequency with another source 97 in addition to being energized most frequently coincidently with the source E' as assumed in the foregoing. However, only the simplest order of frequency is depicted in FIG. 7 for purposes of illustration. Thus all of the other current values occurring between all possible pairs of input sources are shown as the same minimal value. It will be appreciated that these current values will in practice also vary as the frequency of coincidence of energization varies.

By identifying the particular probe 91 energized during an interrogation operation at the same time that the terminal 95 carrying the current value of the greatest magnitude is identified, an exact correlation between random occurrences controlling the energization of the two groups of input sources 96 and 97 is readily established. When this correlation has been so established the memory pad 90 may be prepared for another series of random energizations of the sources 96 and 97 and a subsequent correlation established. This is accomplished by restoring the interwoven strands of the memory pad 90 to a uniform magnetic remanence and hence to a uniform impedance.

A number of reset operations may be applied to effect the magnetic restoration and a specific illustrative means for this purpose is depicted in FIG. 5. The reset switch 107 is controlled to apply a negative reset voltage pulse 112 simultaneously to each of the probes 91 via the unilateral conducting elements 110 and the conductors 109. The reset switch 107 also controls, via the conductor 108, the ground control circuits 105 so that the sources 97 are simultaneously energized to provide simultaneous grounds for each of the possible current paths through the memory pad 90. The voltage pulse 112 is of sufficient magnitude such that the currents induced in the paths are effective to switch the remanent magnetizations of all of the magnetic strands making up the current paths regardless of the extent of magnetization. When this flux switching is completed the memory pad 90 is in readiness for a subsequent input cycle of operation.

Figure 8:
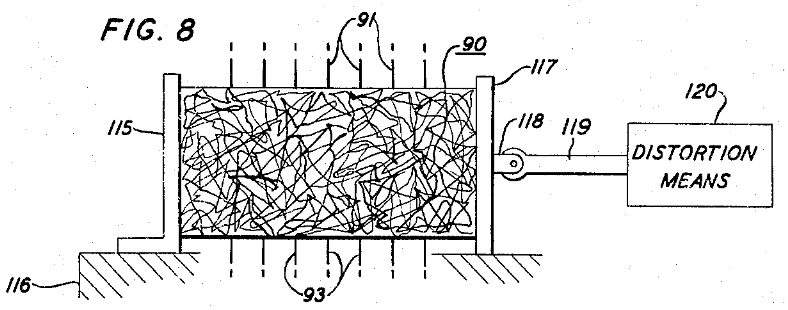
FIG. 8 depicts an alternate reset means applicable in connection with a reset operation of the embodiment of the invention shown in FIG. 5.

In the foregoing description of an illustrative operation of the embodiment of FIG. 5, it will be appreciated that, in order to maintain constant the relative impedances of the current paths presented by the interwoven strands of the pad 90, it is necessary that the physical relationships between the random interconnections of strands not be disturbed. This requirement provides the basis for a novel alternate reset means advantageously employed in connection with the embodiment of FIG. 5. An illustrative arrangement for accomplishing a wholly mechanical restoration of the remanent flux in the memory pad 90 is depicted in FIG. 8. The memory pad 90 having inserted therein probes 91 and 93 is rigidly maintained at one end by retaining means such as an angle piece 115 affixed to a base 116. The retaining means is insulated from the magnetic strands of the pad 90. At the other end, the pad 90 has affixed thereto also in electrical insulation an end plate 117 having a lug 118 affixed thereto. A shaft 119 is movably connected to the lug 118 at one end and is associated at its other end with a distortion means 120. The latter means may comprise any readily devisable means for operating the shaft 119 in such a way as to compress, stretch, twist, or otherwise cause a substantial physical distortion of the pad 90 from its normal configuration. The distortion means 120 may be operated responsive to electrical control circuitry or, in one practical arrangement, may be operated manually. When a reset operation is performed by the reset arrangement of FIG. 8 the physical distortion caused in the memory pad 90 causes a complete disarrangement of the random physical interconnections of the strands making up the pad 90 with the result that the pattern of remanent magnetizations induced during an input phase of operation will be wholly disrupted. The magnetizations remaining after the distortion operation will achieve flux closure through completely random paths which bear no relation to the earlier patterns induced during the input phase. These random magnetizations will be uniformly distributed throughout the memory pad 90 and the current paths "learned" through the memory pad 90 during the input cycle are thus "unlearned" by the physical distortion of the magnetic strands. The pad 90 will now be in readiness for a subsequent input cycle of operation.

In describing the various embodiments of this invention, current and voltage pulses of particular polarities were assumed. It will be understood that these polarities were selected for illustrative purposes only and the arrangements described are readily adapted within the principles of this invention to operate with other currents and voltages than those specifically described. It will further be understood that, particularly in connection with the embodiment of FIG. 5, the illustrative arrangements described may be employed to perform other and different functions and may operate in different contexts. Thus, for example, although current pulses of the same magnitude and ground potential pulses from the sources 96 and 97, respectively, were assumed in the embodiment of FIG. 5, the memory pad 90 is also advantageously employed in determining relative magnitudes of input current pulses of one polarity from the sources 96 and input current pulses of the other polarity from the sources 97 when coincidences of such pulses appear. Thus, the impedance of current paths between electrodes 92 in the memory pad 90 is controllable not only by the repetition of current pulses through the magnetic strands making up the paths, but also by varying the magnitude of the current pulses applied to the memory pad 90.

It is thus to be understood that what have been described are considered to be only specific illustrative embodiments according to the principles of this invention. Accordingly, various and numerous other arrangements may be devised by one skilled in the art without departing from the spirit and scope of this invention.

What is claimed is:

1. A memory circuit comprising a plurality of information storage plates each of an electrically conductive magnetic material having substantially rectangular hysteresis characteristics, a plurality of energizing electrodes in electrical contact with one side of each of said storage plates, said electrodes being arranged in a plurality of groups, each of said groups including corresponding electrodes of said plurality of storage plates, a ground plate in electrical contact with the entire other side of each of said storage plates, a plurality of write circuits for said electrode groups, respectively, for inducing remanent fluxes in discrete portions of said storage plates between said energizing electrodes and said ground plates, each of said write circuits comprising a write pulse source for providing a write pulse of sufficient magnitude to cause complete flux switchings in said discrete portions, a plurality of first branch circuits, each of said first branch circuits including one of said energizing electrodes, a discrete portion of a storage plate, a ground plate, and a transistor gating means, and a unidirectional current element connected between said write pulse source and each of said branch circuits; and means for selectively enabling said transistor gating means.

2. A memory circuit as claimed in claim 1 also comprising a plurality of read circuits for said electrode groups, respectively, each of said read circuits comprising a read pulse source for subsequently providing a read pulse of a polarity opposite to that of said write pulse also of sufficient magnitude to cause complete flux switchings in said discrete portions, a plurality of second branch circuits, each of said second branch circuits including one of said energizing electrodes, a discrete portion of a storage plate, a ground plate, and a load resistor; a unidirectional current element connected between said read pulse source and each of said second branch circuits, and means for detecting potential changes across said load resistors of said second branch circuits.

3. A memory circuit as claimed in claim 2 in which the branch circuits of said plurality of first and said plurality of second branch circuits each has a common current path including one of said energizing electrodes, a discrete portion of a storage plate, and a ground plate.

References Cited by the Examiner

UNITED STATES PATENTS

| | | | |
|---|---|---|---|
| 2,863,712 | 12/58 | Potter | 340—174.1 |
| 2,919,432 | 12/59 | Broadbent | 340—174 |
| 3,123,808 | 3/64 | Ward | 340—174 |

IRVING L. SRAGOW, *Primary Examiner.*

JOHN F. BURNS, *Examiner.*